United States Patent [19]

Hubred et al.

[11] 4,317,730

[45] Mar. 2, 1982

[54] PURIFICATION OF AQUEOUS LIQUIDS USED IN MANGANESE NODULE PROCESSING

[75] Inventors: Gale L. Hubred, Richmond; Robert T. Lewis, Albany, both of Calif.

[73] Assignee: Chevron Research Company, San Francisco, Calif.

[21] Appl. No.: 183,111

[22] Filed: Sep. 10, 1980

[51] Int. Cl.[3] .............................. B01D 43/00

[52] U.S. Cl. .............................. 210/695

[58] Field of Search .............................. 55/3, 100; 209/214; 210/695, 222, 223; 423/49

[56] References Cited

U.S. PATENT DOCUMENTS

| | | | |
|---|---|---|---|
| 2,125,846 | 8/1938 | Laughlin | 210/223 |
| 2,400,461 | 5/1946 | Hills | 210/695 |
| 4,049,438 | 9/1977 | Sridhar et al. | 423/49 |
| 4,079,002 | 3/1978 | Iannicelli | 210/695 |

*Primary Examiner*—Ivars C. Cintins

*Attorney, Agent, or Firm*—D. A. Newell; S. R. LaPaglia; W. D. Reese

[57] ABSTRACT

Fine particulate solids are removed from aqueous liquid previously employed in processing manganese nodules by subjecting the liquid to high gradient magnetic separation.

6 Claims, 3 Drawing Figures

PURIFICATION OF AQUEOUS LIQUIDS USED IN MANGANESE NODULE PROCESSING

BACKGROUND OF THE INVENTION

This invention concerns the art of manganese nodule processing. More specifically, the invention concerns a method for removing finely divided solids from water used in processing manganese nodules.

Manganese nodules are found at various locations on the ocean floor. The nodules have a concentric layer structure, and include many different minerals such as hydrous manganese and iron oxides and clays. The nodules contain metals such as copper, nickel, cobalt, molybdenum, manganese and iron. They also include a large variety of other minerals and inclusions. Several methods have been proposed for recovering the nodules for their metals (Cu, Co, Ni and Mn) values. Typically, proposed nodule mining systems make use of mechanical scoops or suction devices to harvest the nodules and some sediment. [The nodules can be concentrated and separated from the very fine (≃1 micron) sediment in a simple hydraulic device.] The nodules are then transported to the surface of the ocean, usually as a slurry in sea water. The sea water is decanted and returned to the ocean. The nodules are unavoidably abraded and fractured to some extent during transport to the water surface. Although most of the solids brought to the surface in the nodule slurry can be settled out of the slurry prior to discharging the sea water, a residue of finely divided, dispersed solids is present in the water and is not easily settled. This finely divided solids residue presents a potential contaminant when the water is discharged. In the case of a large scale nodule mining operation, the amount of finely divided solids potentially to be discharged into the ocean from the nodule recovery operation could result in a water pollution problem. The present invention is concerned, in part, with preventing ocean water pollution from finely divided solids as a result of contaminated sea water discharge in a nodule recovery operation. Aqueous liquids containing finely divided nodule solids are also generated in various operations used for recovering valuable metals such as cobalt, nickel and copper from manganese nodules. The present invention may also be advantageously employed in removing finely divided solids from such nodule processing streams. A variety of processing systems have been suggested in the prior art for removing the valuable metals from the nodules.

High gradient magnetic separation is used commercially to separate discolorants from clay to brighten the clay. Finely divided clay is slurried in water and is passed through a cartridge containing a ferromagnetic matrix. The matrix is maintained in a strong magnetic field. A magnetically susceptible fraction consisting of ferromagnetic and paramagnetic particles, termed "mags", is held onto the matrix, while diamagnetic clay particles, termed "tails", pass through the matrix and out of the filtering cartridge. Beneficiation of clay, calcium carbonate, and the like by magnetic separation is discussed in U.S. Pat. No. 3,471,011, No. 3,482,685, No. 3,980,240 and No. 3,985,646. Types of high gradient magnetic separation apparatus are discussed in U.S. Pat. No. 3,627,678, and No. 3,676,337. Magnetic separation has also been used commercially for beneficiating magnetic iron ores. Such a system is discussed in U.S. Pat. No. 3,608,718. High gradient magnetic separation has been proposed as a method for removing oil and suspended solids from waste water streams. Magnetically susceptible pollutants can be removed directly, while non-magnetic pollutants can be removed by seeding the waste water with magnetite and agglomerating the pollutants prior to magnetic treatment. See, for example, IEEE Transactions On Magnetics, Vol. Mag-14, No. 5, September 1978, pages 491–493.

SUMMARY OF THE INVENTION

The present invention concerns purification of aqueous liquids used in processing of manganese nodules by means of high gradient magnetic separation. The present invention is based on the unexpected discovery that substantially all of the finely divided solids generated in processing of manganese nodules can be removed from aqueous liquid used in processing the nodules by means of the technique of high gradient magnetic separation in spite of the fact that the nodules contain diamagnetic as well as paramagnetic materials.

BRIEF DESCRIPTION OF THE DRAWINGS

The attached drawings show data generated in carrying out tests on use of the present invention for removing finely divided manganese nodule fines from an aqueous solid solution. The data illustrated in the drawings are discussed in the Example below.

DETAILED DESCRIPTION OF THE INVENTION

The method of the present invention can be used for removing finely divided solids from any aqueous liquid used in transporting, comminuting, leaching, dissolving, or otherwise processing manganese nodules or components of manganese nodules. Use of the present invention is particularly advantageous in removing finely divided solids from sea water which has been used in transporting nodules from the ocean floor to a surface storage or transporting vessel. By removing finely divided solids from sea water prior to discharging the water by means of the method of the present invention, solids pollution of the ocean in the nodule mining area can be substantially decreased.

According to the invention, an aqueous liquid feed containing finely divided solids, resulting from processing of manganese nodules, is passed through a ferromagnetic matrix. Suitable ferromagnetic matrices may be those conventionally employed in high gradient magnetic separation apparatus. The matrix must, of course, be permeable to the aqueous liquid. Conventional high gradient separation matrices normally have a large void fraction and only a small pressure drop generally results from passing liquids through the conventional matrix. Preferably, the matrix employed in carrying out the invention is a filamentous ferromagnetic material having an average diameter of about 10 to 100 microns. A particularly preferred matrix for use in carrying out the invention is a ferromagnetic stainless steel wool, since use of the stainless steel inhibits corrosion of the matrix by sea water and other corrosive liquids.

The matrix is maintained in a cartridge or other suitable container means in the presence of a magnetic field, while the aqueous liquid is passed through the matrix. The average strength of the magnetic field in which the matrix is maintained should be at least about 2 kiloOersteds (kOe). Preferably, the matrix is maintained in a magnetic field having an average strength of at least 10 kOe.

In general, the higher the average strength of the magnetic field in which the matrix is maintained in carrying out the separation, the higher the superficial liquid velocity which can be employed. The maximum magnetic field strengths which are practically available with presently available equipment are in the range 15–25 kOe. Fields within this range of strength are quite suitable for use in carrying out the invention. For example, in a preferred embodiment using an average field strength of 15–25 kOe a superficial velocity of 1 to 10 centimeters per second is preferably employed.

EXAMPLE

Figure 1:
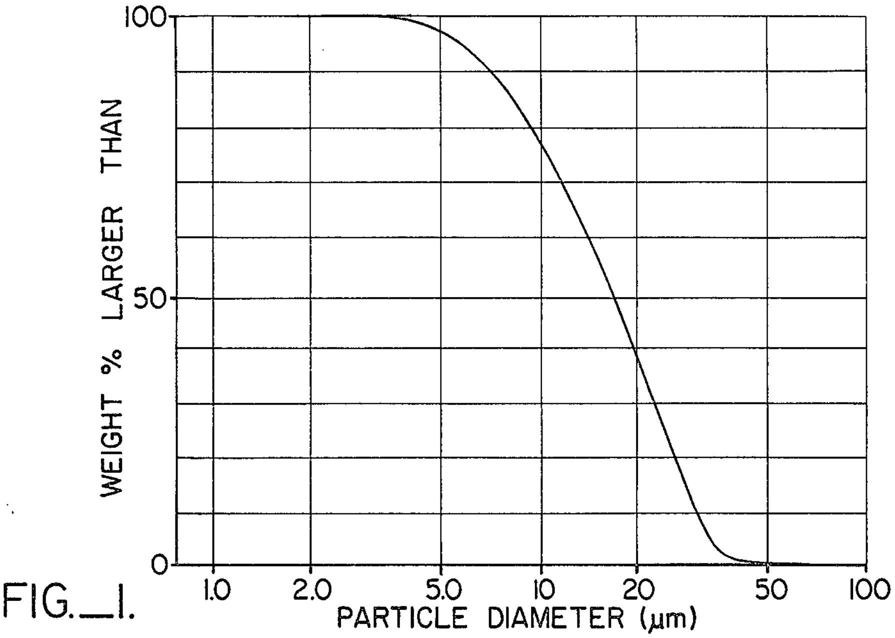
Figure 2:
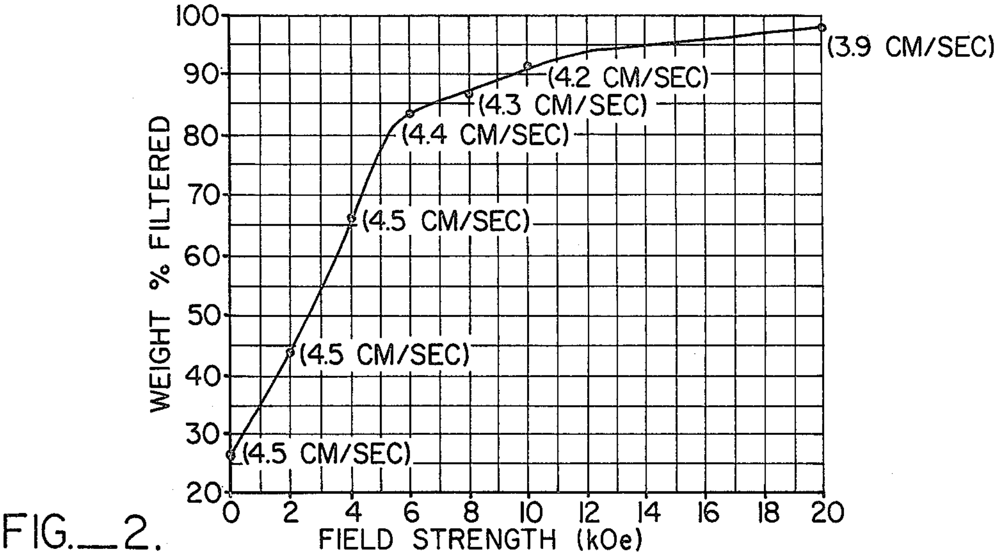
Figure 3:
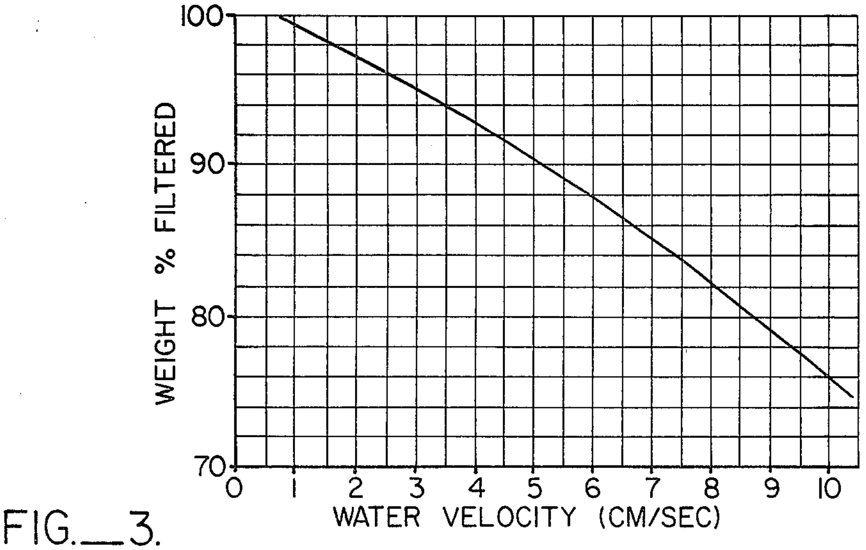

The use of high gradient magnetic separation to remove manganese nodule fines from an aqueous liquid was demonstrated on a simulated sea water feed containing 1 gram of finely ground manganese nodules per liter of liquid in a 3.5 weight percent sodium chloride solution. The size distribution of the fines in the liquid is shown in FIG. 1. The aqueous liquid feed containing the nodule fines was passed through a conventional high gradient magnetic separator packed with fine grade magnetic stainless steel wool at varying superficial velocities and varying magnetic field strengths. FIG. 2 shows the proportion of solids removed from the feed at a relatively constant superficial velocity between 3.9 and 4.5 centimeters per second (superficial velocities used to obtain data points are shown in the figure), varying the strength of the applied magnetic field. FIG. 3 shows the proportion of solids filtered from the aqueous feed at a constant applied field strength of 10 kOe, varying the superficial velocity. As shown in FIGS. 2 and 3, the method of the present invention can be employed to remove essentially all the manganese nodule fines present in a salt water solution. This is unexpected, in that the composition of the nodules is highly heterogeneous, including both diamagnetic and paramagnetic materials.

From the foregoing description of the invention, it will be apparent to those skilled in the art that a variety of embodiments, alternatives and modifications of the embodiments depicted are possible. Such equivalents and modifications are within the broad scope of the present invention as defined in the appended claims.

What is claimed is:

1. A method for removing essentially all finely divided solids, including both diamagnetic and paramagnetic materials, from an aqueous liquid previously employed in processing manganese nodules, comprising:

passing said liquid through a ferromagnetic matrix maintained in a magnetic field having an average strength of at least 2 kiloOersteds.

2. A method according to claim 1 wherein said aqueous liquid is sea water used for transporting manganese nodules from the ocean floor to a surface vessel.

3. A method according to claim 1 wherein said matrix is filamentous ferromagnetic material having an average diameter of about 10 to 100 microns.

4. A method according to claim 1 wherein said matrix is ferromagnetic stainless steel wool.

5. A method according to claim 1 wherein said magnetic field has an average strength of at least 10 kOe.

6. A method according to claim 1 wherein said magnetic field has an average strength of about 15 to 25 kiloOersteds and said aqueous liquid is passed through said matrix at a superficial velocity of about 1 to 10 centimeters per second.

* * * * *